US008452778B1

(12) United States Patent
Song et al.

(10) Patent No.: US 8,452,778 B1
(45) Date of Patent: May 28, 2013

(54) TRAINING OF ADAPTED CLASSIFIERS FOR VIDEO CATEGORIZATION

(75) Inventors: Yang Song, San Jose, CA (US); Ming Zhao, San Jose, CA (US); Jay Yagnik, Mountain View, CA (US)

(73) Assignee: Google Inc., Mountain View, CA (US)

( * ) Notice: Subject to any disclaimer, the term of this patent is extended or adjusted under 35 U.S.C. 154(b) by 108 days.

(21) Appl. No.: 12/874,015

(22) Filed: Sep. 1, 2010

Related U.S. Application Data

(60) Provisional application No. 61/262,891, filed on Nov. 19, 2009.

(51) Int. Cl.
*G06F 17/30* (2006.01)
*G10L 19/12* (2006.01)

(52) U.S. Cl.
USPC .......................................... 707/748; 704/233

(58) Field of Classification Search
None
See application file for complete search history.

(56) References Cited

U.S. PATENT DOCUMENTS

| | | | |
|---|---|---|---|
| 5,754,681 A | 5/1998 | Watanabe et al. | |
| 5,930,392 A | 7/1999 | Ho | |
| 6,853,982 B2 | 2/2005 | Smith et al. | |
| 6,915,025 B2 | 7/2005 | Wang et al. | |
| 7,024,033 B2 | 4/2006 | Li et al. | |
| 7,039,856 B2 | 5/2006 | Peairs et al. | |
| 7,107,520 B2 | 9/2006 | Gargi | |
| 7,203,669 B2 * | 4/2007 | Lienhart et al. | 706/48 |
| 7,519,217 B2 | 4/2009 | Liu et al. | |
| 7,609,893 B2 | 10/2009 | Luo et al. | |
| 8,015,132 B2 | 9/2011 | Xu | |
| 8,090,621 B1 | 1/2012 | Chakrabarti et al. | |
| 2002/0059221 A1 * | 5/2002 | Whitehead et al. | 707/5 |
| 2006/0031217 A1 | 2/2006 | Smith et al. | |
| 2007/0255755 A1 * | 11/2007 | Zhang et al. | 707/104.1 |
| 2008/0228749 A1 | 9/2008 | Brown | |
| 2009/0208106 A1 | 8/2009 | Dunlop et al. | |
| 2009/0234886 A1 | 9/2009 | Raghavan | |
| 2009/0281970 A1 | 11/2009 | Mika et al. | |
| 2009/0292685 A1 | 11/2009 | Liu et al. | |
| 2009/0327336 A1 * | 12/2009 | King et al. | 707/103 R |
| 2010/0125539 A1 | 5/2010 | Aucouturier et al. | |
| 2010/0220922 A1 | 9/2010 | Okada | |

OTHER PUBLICATIONS

Cao, L., et al., "Annotating Photo Collections by Label Propagation According to Multiple Similarity Cues," Proceeding of the 16th ACM international conference on Multimedia, 2008, 9 pages.

(Continued)

*Primary Examiner* — Tarek Chbouki
(74) *Attorney, Agent, or Firm* — Fenwick & West LLP

(57) ABSTRACT

A classifier training system trains adapted classifiers for classifying videos based at least in part on scores produced by application of text-based classifiers to textual metadata of the videos. Each classifier corresponds to a particular category, and when applied to a given video indicates whether the video represents the corresponding category. The classifier training system applies the text-based classifiers to textual metadata of the videos to obtain the scores, and also extracts features from content of the videos, combining the scores and the content features for a video into a set of hybrid features. The adapted classifiers are then trained on the hybrid features. The adaption of the text-based classifiers from the textual domain to the video domain allows the training of accurate video classifiers (the adapted classifiers) without requiring a large training set of authoritatively labeled videos.

18 Claims, 5 Drawing Sheets

OTHER PUBLICATIONS

Carvalho, R., "Metadata goes where Metadata is: contextual networks in the photographic domain," ESWC 2008 Ph. D. Symposium, 2008, 5 pages.

Chang, S., et al., "Recent Advances and Challenges of Semantic Image/Video," IEEE International Conference on Acoustics, Speech and Signal Processing, 2007, 4 pages.

Rodriguez, M., et al., "Automatic Metadata Generation Using Associative Networks," ACM Transactions on Information Systems, Feb. 2009, pp. 7:1-7:20, vol. 27, No. 2, Article 7.

Aradhye, H., et al., "Video2Text: Learning to annotate video content," IEEE International Conference on Data Mining Workshops, Dec. 6, 2009, pp. 144-151.

Blum, A., et al., "Combining Labeled and Unlabeled Data with Co-Training," COLT: Proceedings of the Workshop on Computational Learning Theory, Morgan Kaufmann Publishers, 1998, pp. 92-100.

Cai, C., et al., "Hierarchical clustering of WWW image search results using visual, textual and link information," In Proc. of ACM MM'04, Oct. 10-16, 2004, pp. 952-959.

Cui, F., et al., "Content-enriched classifier for web video classification," In Proc. of SIGIR'10, Jul. 19-23, 2010, pp. 619-626.

Feng, H., et al., A boot-strapping framework for annotating and retrieving WWW images. In Proc. of ACM MM'04, Oct. 10-16, 2004, pp. 55-62.

Fischer, S., et al., Automatic recognition of film genres, In Proc. of ACM Multimedia'95, Nov. 5-9, 1995, pp. 295-304.

Hall, K., et al., "MapReduce/Bigtable for distributed optimization," In NIPS 2010 Workshop on Learning on Cores, Clusters and Clouds, 2010, pp. 1-7.

Huang, G., et al., Text-based video content classification for online video-sharing sites. Journal of the American Society for Information Science and Technology, 2010, vol. 61, No. 5, pp. 891-906.

Lin, A., et al., "News video classification using SVM-based multimodal classifiers and combination strategies," In Proc. of ACM Multimedia'02, Dec. 1-6, 2002, pp. 323-326.

Toderici, H., et al., "Finding meaning on YouTube: Tag recommendation and category discovery," In Proc. of IEEE CVPR-10, 2010, 8 Pages.

Yang, E., et al., "Multi-modality web image categorization," In Proc. of ACM MIR-07, Sep. 28-29, 2007, pp. 265-274.

Zhang, D., et al., "Joint categorization of queries and clips for web-based video search," In Proc. of MIR'06, Oct. 26-27, 2006, pp. 193-202.

Belkin, M., et al., "Manifold Regularization: A Geometric Framework for Learning from Labeled and Unlabeled Examples," Journal of Machine Learning Research, 2006, vol. 7, pp. 2399-2434.

Blei, D. M. et al., "Latent Dirichlet Allocation," Journal of Machine Learning Research, 2003, pp. 993-1022, vol. 3.

Christoudias, C. M., et al., Co-Training with Noisy Perceptual Observations, CVPR, 2009, pp. 1-10.

Duchenne, O., et al., "Automatic Annotation of Human Actions in Video," ICCV, 2009, 8 pages.

Erosheva, E. et al., "Mixed Membership Models of Scientific Publications," Proceedings of the National Academy of Sciences, 2004, pp. 5220-5227.

Everingham, M., et al., "Hello! My Name is . . . Buffy—Automatic Naming of Characters in TV Video," BMVC, 2006, 10 pages.

Fan, R.-E., et al., "Liblinear: A library for large linear classification," Journal of Machine Learning Research, 2008, vol. 9, pp. 1871-1874.

Feng, H., et al., "A Bootstrapping Framework for Annotating and Retrieving WWW Images," Proc. ACM MM, 2004, 8 pages.

Gargi, U. et al., "Solving the Label-Resolution Problem in Supervised Video Content Classification," Proc. of ACM Multimedia Information Retrieval, 2008, pp. 276-282.

Gupta, S., et al., "Watch, Listen & Learn: Co-Training on Captioned Images and Videos," Proceedings of the European Conference on Machine Learning and Principles and Practice of Knowledge Discovery in Databases (ECML), 2008, 16 pages.

Herring, S.C. et al., "Bridging the Gap: A Genre Analysis of Weblogs," Proceedings of the 37th Annual Hawaii International Conference on System Sciences, Hawaii, Jan. 5-8, 2004, pp. 1-11.

Jones, M. J., et al., "Statistical Color Models with Application to Skin Detection," International Journal of Computer Vision (IJCV), Jan. 2002, vol. 46, No. 1, pp. 81-96.

Kumar, S., et al., "Discriminative Fields for Modeling Spatial Dependencies in Natural Images," Advances in Neural Information Processing Systems (NIPS), 2004, 8 pages.

Lafferty, J., et al., "Conditional Random Fields: Probabilistic Models for Segmenting and Labeling Sequence Data," Proceedings of International Conference on Machine Learning (ICML), 2001, 8 pages.

Laptev, I., et al., "Learning Realistic Human Actions from Movies," Proceedings of the IEEE Conference on Computer Vision and Pattern Recognition (CVPR), 2008, 8 pages.

Leung, T., et al., "Representing and Recognizing the Visual Appearance of Materials Using Three-Dimensional Textons," International Journal of Computer Vision (IJCV), 2001, vol. 43, No. 1, pp. 29-44.

Liu, J., "Recognizing Realistic Actions from Videos "In the Wild"," Computer Vision and Pattern Recognition (CVPR), 2009, 1996-2003, 8 pages.

Lowe, D. G., "Distinctive Image Features from Scale-Invariant Keypoints," International Journal of Computer Vision (IJCV), 2004, vol. 60, No. 2, pp. 91-110.

McDonald, R. et al., "Distributed Training Strategies for the Structured Perceptron," Proceedings of Human Language Technologies Conference of the North American Chapter of the Association for Computational Linguistics, Los Angeles, CA, Jun. 1-6, 2010, pp. 456-464.

Mishne, G. et al., "Leave a Reply: An Analysis of Weblog Comments," Proceedings of the 3rd Annual Workshop on the Weblogging Ecosystem, Edinburgh, Scotland, May 23, 2006, 8 pages.

Neapolitan, R. E., "Learning Bayesian Networks," Prentice Hall, Upper Saddle River, NJ, USA, 2003, 703 pages.

Popescu, A.M. et al., "Detecting Controversial Events from Twitter," Proceedings of the ACM 19th Conference on Information and Knowledge Management (CIKM 2010), Toronto, Canada, Oct. 26-30, 2010, pp. 1873-1876.

Ramachandran, C., et al., "VideoMule: A Consensus Learning Approach to Multi-Label Classification from Noisy User-Generated Videos," ACM Multimedia, 2009, 4 pages.

Rowley, H.A. et al., "Large Scale Image-Based Adult-Content Filtering," Proc. of VISAPP, 2006, 7 pages.

Sargin, E. M., et al., "Audiovisual Celebrity Recognition in Unconstrained Web Videos," Proc. ICASSP, 2009, 4 pages.

Schindler, G., et al., "Internet Video Category Recognition," First IEEE Workshop on Internet Vision, CVPR, 2008, 7 pages.

Smeaton, A. F., et al., "Evaluation Campaigns and TRECVid," Proceedings of the 8th ACM International Workshop on Multimedia Information Retrieval, ACM Press, Oct. 26-27, 2006, pp. 321-330.

Snoek, C. G.M., et al., "Early Versus Late Fusion in Semantic Video Analysis," ACM Multimedia 2005, Nov. 6-11, 2005, Singapore, 4 pages.

Viola, P., et al., "Rapid Object Detection Using a Boosted Cascade of Simple Features," Proceedings of IEEE Computer Society Conference on Computer Vision and Pattern Recognition (CVPR), 2001, vol. 1, pp. 511-518.

Yang, J., et al., "Cross-Domain Video Concept Detection Using Adaptive SVMS," Proceedings of the 15th International Conference on Multimedia, Sep. 2007, Augsburg, Bavaria, Germany, 10 pages.

Yang, L., et al., "Multi-Modality Web Video Categorization," Proc. MIR, 2007, ACM Press, pp. 265-274.

Yano, T. et al., "Predicting Response to Political Blog Posts with Topic Models," Proceedings of Human Language Technologies Conference of the North American Chapter of the Association for Computational Linguistics, Boulder, Colorado, May 30-Jun. 5, 2009, pp. 477-485.

Yano, T. et al., "What's Worthy of Comment? Content and Comment Volume in Political Blogs," Proceedings of the 4th International Conference on Weblogs and Social Media, Washington, D.C., May 23-26, 2010, pp. 359-362.

Zanetti, S., et al., "A Walk Through the Web's Video Clips," First IEEE Workshop on Internet Vision, Computer Vision and Pattern Recognition (CVPR08), 2008, 8 pages.

Zhang, H., et al., "Automatic Partitioning of Full-Motion Video," Multimedia Systems, 1993, vol. 1, No. 1, pp. 10-28.

Zhu, X., et al., "Learning from Labeled and Unlabeled Data with Label Propagation," CMU CALC Tech Report CMU-CALD-02-107, 19 pages.

Zhu, X., "Semi-Supervised Learning Literature Survey," Computer Sciences Technical Report 1530, University of Wisconsin-Madison, 2005, pp. 1-38.

Chang, S-F. et al., "Combining Text and Audio-Visual Features in Video Indexing," ICASSP, 2005, pp. V-1005-V-1008.

Siersdorfer, S. et al., "Automatic Video Tagging Using Content Redundancy," SIGIR'09, ACM, Jul. 19-23, 2009, pp. 395-402.

\* cited by examiner

TRAINING OF ADAPTED CLASSIFIERS FOR VIDEO CATEGORIZATION

CROSS REFERENCE TO RELATED APPLICATIONS

The application claims the benefit of Provisional Application No. 61/262,891, filed on Nov. 19, 2009, which is incorporated herein by reference.

BACKGROUND

1. Field of Art

The present invention generally relates to the field of digital video, and more specifically, to methods of training accurate classifiers for identifying the categories represented by a video.

2. Background of the Invention

Video hosting systems, such as YOUTUBE or GOOGLE VIDEO, have become an increasingly popular way of sharing and viewing digital videos, with users contributing tens of millions of videos each year. Accurate categorization of a video is of great value in such systems, permitting users to search for videos corresponding to given categories, video hosting systems to more accurately match videos with relevant advertising, and the like.

However, the video information provided by the user who contributes a video often does not result in the correct categorization of the video. For example, for a set of predetermined categories including categories such as "Sports," "Baseball," "Tennis," and the like, a video entitled with the name of a tennis player featured in the video would not in itself directly permit the video to be properly categorized as "Tennis" or "Sports."

Learning algorithms can be employed to train a classifier function for a given category (e.g., "Tennis") that, when applied to features of a video (such as metadata of the video), outputs a measure of the relevance of the video to the category. Then, the trained classifier function for a given category can be applied to a video and the resulting measure of relevance used to determine whether the video falls under that category. However, to train a classifier function for a category, most learning algorithms employ supervised learning, which requires as input a training set of videos known a priori to be representative of the category. Further, supervised learning tends to produce more accurate classifier functions when trained on a larger training set, and/or a training set with features that are more useful for categorization purposes. A training set useful for supervised learning can be produced by humans viewing videos and manually categorizing them, but manual categorization is time-consuming due to the need to watch the entire video, or at least a significant representative portion thereof. Nor can humans efficiently view and label a sufficiently large sample of videos in a video hosting service where tens of thousands of videos are being uploaded every day. Thus, there are typically few pre-categorized videos available for training purposes, and the classifier functions trained using these small training sets are therefore not as effective as could be desired in categorizing the large number of videos that have not already been manually categorized.

SUMMARY

A classifier training system trains adapted classifier functions (hereinafter simply "classifiers") for classifying videos based at least in part on scores produced by application of text-based classifiers to metadata of the videos. Each classifier corresponds to a particular category (e.g., "Sports"), and when applied to a given video indicates whether the video represents the corresponding category. More specifically, the classifier training system begins with some set of pre-determined categories. For each category, there is a corresponding text-based classifier that outputs a value indicating whether a given textual input represents the classifier's category. The text-based classifiers are trained from exogenous textual content, such as web pages, that have been previously authoritatively labeled (e.g., by a human expert) as representing one or more of the categories. The training of the text-based classifiers may be performed by the classifier training system itself, or it may be performed by another system, with the text-based classifiers being provided as input to the classifier training system.

The classifier training system then applies the text-based classifiers to textual metadata of a set of videos, thereby producing a set of scores for each video. The set of scores constitutes a score vector, each element of the score vector indicating the relevance of an associated category to the video, based on the textual metadata. The scores are then treated as features of the video. Using the scores from the text-based classifiers as a proxy for the authoritative labeling, an adapted classifier for each category is learned. The adapted classifier for a category can then be applied to an unlabeled video to determine whether the video represents that category. Thus, the adaption of text-based classifiers trained on textual documents for use with videos (specifically, with their textual metadata) allows the training of accurate adapted classifiers for use with videos, even without having a large set of labeled videos for training purposes.

In one embodiment, the adapted classifier is learned based not only on the scores produced by the text-based classifiers, but also on other features. For example, in one embodiment, content features such as video features and audio features are extracted from the video content. The features and the scores produced by the text-based classifiers for the video are combined and together form a single hybrid set of features. The adapted classifiers are then trained based on these hybrid features.

In one embodiment, the classifier training system is not limited to learning adapted classifiers for digital videos, specifically, but rather can learn adapted classifiers for any media object having associated textual metadata, including images, presentations, text documents, audio files, and the like.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

System Architecture

Figure 1:
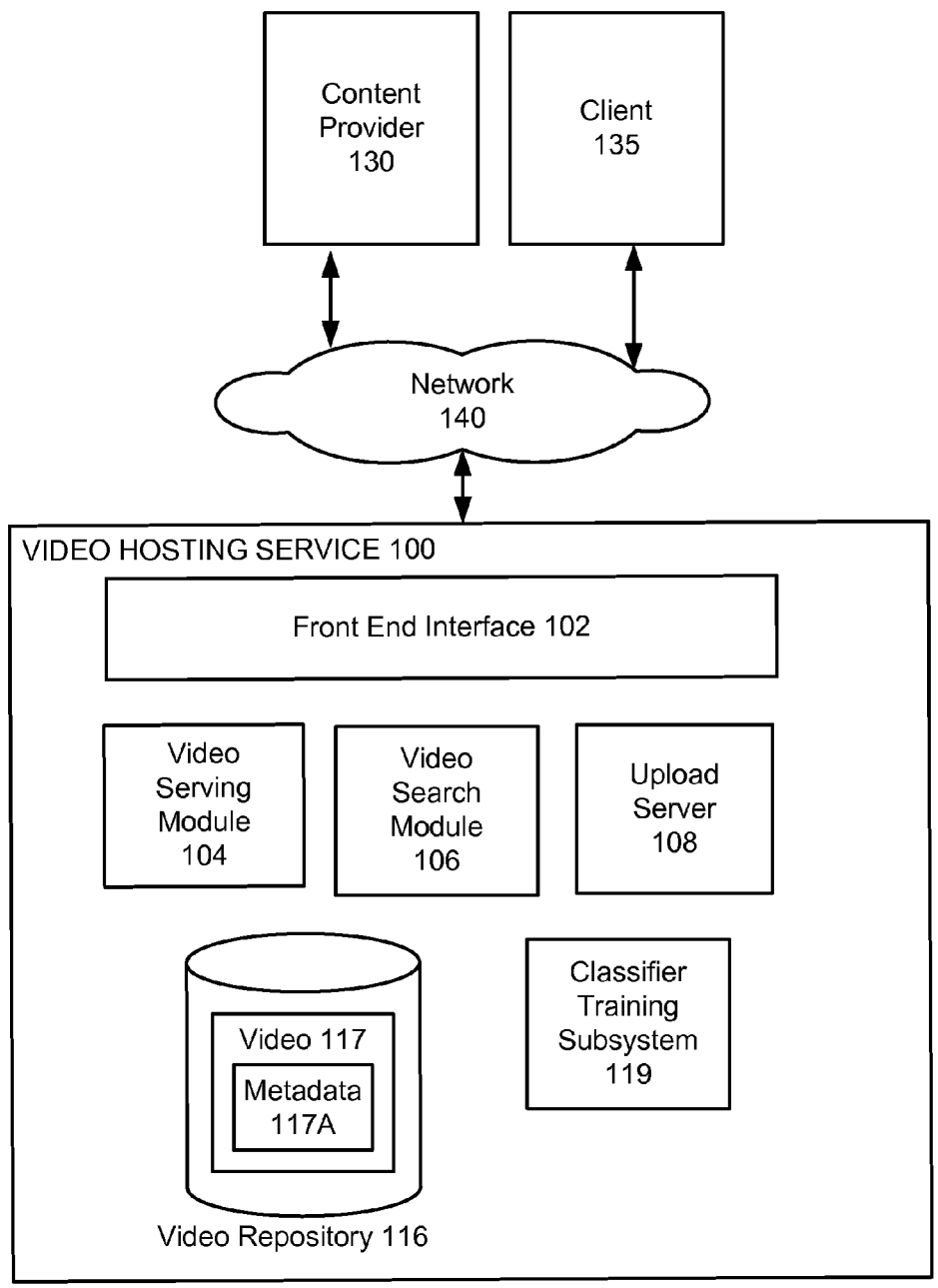
FIG. 1 is a block diagram of a video hosting service in which classifier training can be employed, according to one embodiment.

FIG. 1 is a block diagram of a video hosting service 100 in which classifier training can be employed, according to one embodiment. The video hosting service 100 represents a system such as that of YOUTUBE that stores and provides videos to clients such as the client device 135. The video hosting service 100 communicates with a plurality of content providers 130 and client devices 135 via a network 140 to facilitate sharing of video content between users. Note that for the sake of clarity FIG. 1 depicts only one instance of content provider 130 and client device 135, though there could be any number of each.

The video hosting service 100 additionally includes a front end interface 102, a video serving module 104, a video search module 106, an upload server 108, and a video repository 116. Other conventional features, such as firewalls, load balancers, authentication servers, application servers, failover servers, site management tools, and so forth are not shown so as to more clearly illustrate the features of the video hosting service 100. One example of a suitable service 100 is the YOUTUBE website, found at www.youtube.com. Other video hosting sites are known, as well, and can be adapted to operate according to the teachings disclosed herein. The illustrated components of the video hosting service 100 can be implemented as single or multiple components of software or hardware. In general, functions described in one embodiment as being performed by one component can also be performed by other components in other embodiments, or by a combination of components. Furthermore, functions described in one embodiment as being performed by components of the video hosting service 100 can also be performed by one or more clients 135 in other embodiments if appropriate.

Client devices 135 are computing devices that execute client software, e.g., a web browser or built-in client application, to connect to the front end interface 102 of the video hosting service 100 via a network 140 and to display videos. The client device 135 might be, for example, a personal computer, a personal digital assistant, a cellular, mobile, or smart phone, or a laptop computer.

The network 140 is typically the Internet, but may be any network, including but not limited to a LAN, a MAN, a WAN, a mobile wired or wireless network, a private network, or a virtual private network. Client device 135 may comprise a personal computer or other network-capable device such as a personal digital assistant (PDA), a mobile telephone, a pager, a television "set-top box," and the like.

Conceptually, the content provider 130 provides video content to the video hosting service 100 and the client 135 views that content. In practice, content providers may also be content viewers. Additionally, the content provider 130 may be the same entity that operates the video hosting service 100.

The content provider 130 operates a client device to perform various content provider functions. Content provider functions may include, for example, uploading a video file to the video hosting service 100, editing a video file stored by the video hosting service 100, or editing content provider preferences associated with a video file.

The client 135 operates on a device to view video content stored by the video hosting service 100. Client 135 may also be used to configure viewer preferences related to video content. In some embodiments, the client 135 includes an embedded video player such as, for example, the FLASH player from Adobe Systems, Inc. or any other player adapted for the video file formats used in the video hosting service 100. Note that the terms "client" and "content provider" as used herein may refer to software providing client and content providing functionality, to hardware on which the software executes, or to the entities operating the software and/or hardware, as is apparent from the context in which the terms are used.

The upload server 108 of the video hosting service 100 receives video content from a client 135. Received content is stored in the video repository 116. In response to requests from clients 135, a video serving module 104 provides video data from the video repository 116 to the clients 135. Clients 135 may also search for videos of interest stored in the video repository 116 using a video search module 106, such as by entering textual queries containing keywords of interest. Front end interface 102 provides the interface between client 135 and the various components of the video hosting service 100.

The video repository 116 contains a set of videos 117 submitted by content providers 130. The video repository 116 can contain any number of videos 117, such as tens of thousands or hundreds of millions. Each of the videos 117 has a unique video identifier that distinguishes it from each of the other videos, such as a textual name (e.g., the string "a91qrx8"), an integer, or any other way of uniquely naming a video. The videos 117 can be packaged in various containers such as AVI, MP4, or MOV, and can be encoded using video codecs such as MPEG-2, MPEG-4, H.264, and the like. In addition to their audiovisual content, the videos 117 further have associated metadata 117A, e.g., textual metadata such as a title, description, and/or tags provided by a content provider 130 who uploaded the video.

The video hosting service 100 further comprises a classifier training subsystem 119 that trains accurate video classifiers for a predetermined set of categories, even in the absence of a large number of labeled videos to use as training examples. The trained classifiers can then be applied to a given video to determine which of the categories the video represents. The classifier training subsystem 119 is now described in greater detail.

Figure 2:
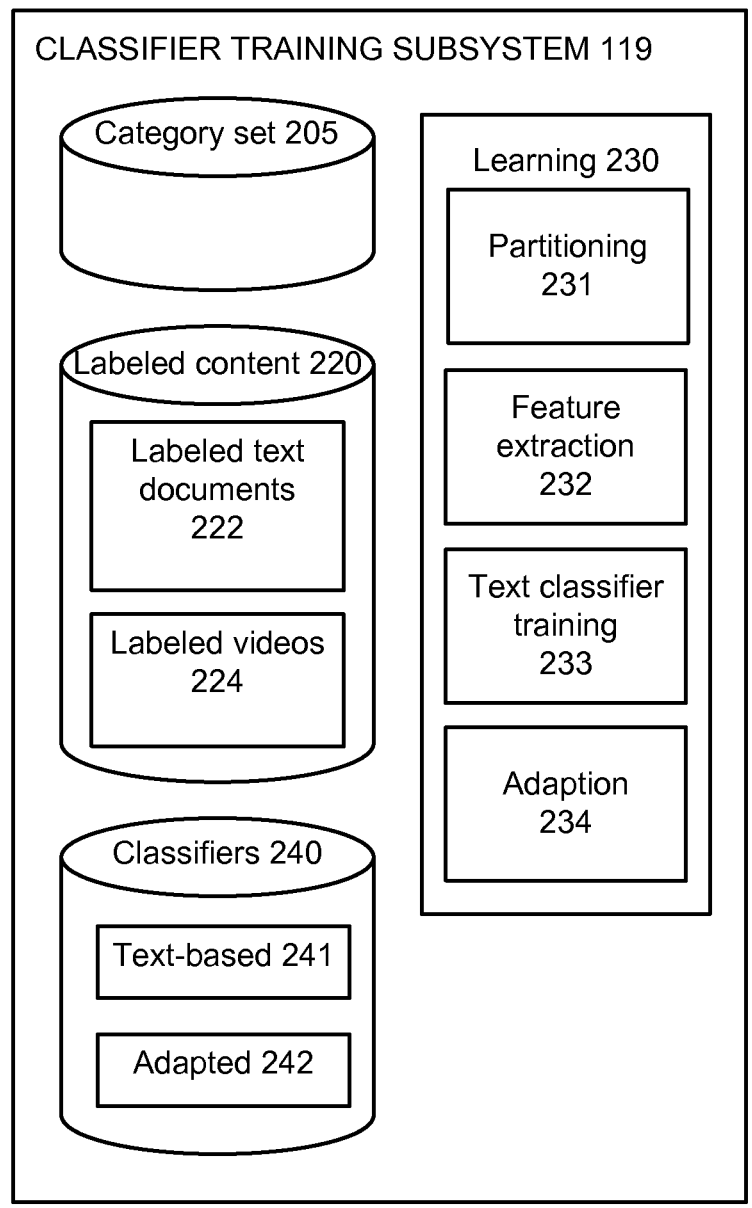
FIG. 2 illustrates the various components of the classifier training subsystem of FIG. 1, according to one embodiment.

FIG. 2 illustrates the various components of the classifier training subsystem 119, according to one embodiment. The classifier training subsystem 119 trains classifiers based on a set of categories and a set of labeled content items, such as textual documents (e.g., web-pages) or videos, that have been previously authoritatively labeled by an authoritative source, such as a human expert, as representing one or more categories of the set of categories. The classifier training subsystem 119 further comprises modules to analyze the labeled content items, thereby learning classifiers that can automatically categorize videos. The video categorization system may be part of a video hosting system, such as YOUTUBE or GOOGLE VIDEO, or may be separate from the video hosting system, receiving input from it and providing output to it.

More specifically, the classifier training subsystem 119 stores a predefined category set 205 representing different categories that a video could represent, such as "Sports," "Tennis," "Gymnastics," "Arts & Entertainment," "Movies," "TV & Video," and the like. In one embodiment, the category set 205 is flat, with no specified relationships between the categories. In another embodiment, the category set 205 is a taxonomy in which the categories are arranged hierarchically, with categories being more general parents and/or more specialized children of other categories. For instance, in the example categories above, "Sports" could be a top-level parent category with child categories "Tennis" and "Gymnastics," and "Arts & Entertainment" could be another top-level category with child categories "Movies" and "TV & Video."

In one embodiment, the taxonomy is a tree with an arbitrary number of levels of depth. A category can be represented in various manners as would be appreciated by one of skill in the art, such as a textual description (e.g., the string "Sports") and an associated unique shorthand numerical identifier (e.g., 1). A video can be said to represent a category if the video contains some representation of the category within the video content itself, e.g., a video represents a category "Tennis" if there are scenes of a tennis match within the visual content of the video. A video can also be said to represent the category if a textual representation of the category is present in textual metadata 117A of the video, e.g., in a user provided description, comments, annotations, or the like. A video can represent many different categories, but users typically are interested in what may be considered the most salient category for the video.

The classifier training subsystem 119 further comprises a labeled content repository 220 containing various content items previously authoritatively labeled by an entity as representing one or more categories from the category set 205. The content items, together with their labels, serve as training data for supervised learning algorithms that learn classifiers for the various categories of the category set 205. In one embodiment, the content items are authoritatively labeled by a human expert trained in the meaning and use of the category set 205. In another embodiment, the authoritative labeling is performing by a labeling algorithm that categorizes content items with a high degree of accuracy. In embodiments in which the category set 205 is represented as a taxonomy tree, a content item is labeled with the "deepest" applicable category in the taxonomy. For example, a video about tennis is labeled "Tennis," not "Sports"; the fact that the video also more generally represents sports can be inferred from the fact that "Tennis" is a child category of "Sports" in the taxonomy tree.

More specifically, the labeled content repository 220 comprises authoritatively labeled text documents 222. The text documents 222 contain primarily textual content, and in one embodiment comprise web pages from various publicly available web sites. In other embodiments, the text documents 222 additionally and/or alternatively comprise other types of types of documents with significant textual content, such as word processing files, pure text files, and the like. The text documents may contain non-textual elements, such as backgrounds, images, etc., in addition to their purely textual portions.

The labeled content repository 220 further comprises authoritatively labeled videos 224. In one embodiment, the authoritatively labeled videos 224 are a subset of the video repository 116, with the addition of labels manually added by expert users for the purposes of classifier training. Since a textual document such as a web page can typically be examined and labeled by a human user (e.g., by visually skimming the title, headings, and images) much more quickly than can a video, which must be watched for some period of time before categories can be reliably determined, there are typically a far greater number of authoritatively labeled text documents 222 than there are authoritatively labeled videos 224. For example, in one embodiment there are roughly 1,000 categories in the category set 205, approximately 100,000 or more labeled web pages in the authoritatively labeled text documents 222, and approximately 10,000 videos in the authoritatively labeled videos 224. The various text documents 222 and videos 224 need not be equally distributed amongst the various categories of the category set 205. Rather, different categories may have different numbers of corresponding text documents 222 and videos 224.

The labeling of the authoritatively labeled text documents 222 and the authoritatively labeled videos 224 can be implemented in various manners in different embodiments, such as by associating each text document or video with some representation of the one or more categories that it represents, e.g., via a list of the shorthand numerical identifiers noted above.

It is appreciated that the labeled content repository 220 need not contain actual copies of the various authoritatively labeled text documents 222 and authoritatively labeled videos 224. In an embodiment in which the text documents and videos are accessible via the internet (e.g., where the text documents are internet-accessible web pages), only a reference such as a uniform resource locator (URL)—and not the content that the reference points to—need be stored in the repository 220.

The classifier training subsystem 119 further comprises a classifier repository 240 containing the classifiers learned based on the content items of the labeled content repository 220. Specifically, the classifier repository 240 comprises text-based classifiers 241—e.g., learned based on the authoritatively labeled text documents 222—and adapted classifiers 242 learned based on the text-based classifiers 241 and the authoritatively labeled videos 224. Each of the classifiers is associated with one of the categories in the category set 205 and, when applied to a video, provides a measure of how strongly the video represents that category. For example, a classifier for the category "Tennis" provides a measure of how strongly a given video represents the sport of tennis, e.g., based on the audiovisual content of the video and/or its textual metadata 117A.

The classifier training subsystem 119 further comprises a learning module 230 that analyzes the content items in the labeled content repository 220 and learns the set of category classifiers 240 that can be used to automatically categorize videos.

Specifically, the learning module 230 comprises a partitioning module 231 that partitions labeled content items used for training—that is, the authoritatively labeled text documents 222 and the authoritatively labeled videos 224—into positive and negative training subsets based on their labels. That is, for both of the types of content items (i.e., text documents 222 and videos 224), and for each category in the category set 205, the partitioning module 231 partitions the training items into some positive subset of items representing the category and some negative subset of items not representing the category.

Thus, referring to the above category examples, the partitioning module 231 could partition the authoritatively labeled text documents 222 into a positive subset of documents representing "Sports" and a negative subset of documents not representing "Sports," a positive subset representing "Tennis" and a negative subset not representing "Tennis," and so forth, for each category in the category set 205. These training subsets could then be used by a text classifier training module 233 to train the text-based classifiers 241, as described below.

Likewise, the partitioning module would partition the authoritatively labeled videos 224 into positive and negative training subsets of videos for each category, and these training subsets could be used by an adaption module 234 to train the adapted classifiers 242, as described below.

In an embodiment in which the category set 205 is structured as a hierarchical taxonomy, the documents representing the category are defined to be the documents labeled as representing either the category or one of its child/descendant categories (i.e., any subcategory of the category, or any subcategories of a subcategory, etc.). The documents not representing the category are then derivatively defined to be the documents not in the positive subset. Similarly, in an embodiment in which the category set 205 is flat rather than hierarchical, the documents representing the category are defined to be only the documents labeled as representing the category, and the documents not representing the category are defined to be all the remaining items.

The classifier training subsystem 119 further comprises a feature extraction module 232 that extracts relevant features from text documents or videos, an optional text classifier training module 233 that trains a classifier for the different categories within the category set 205 using the features extracted from the labeled text documents 222, and an adaption module that adapts information taken from the text domain—i.e., the scores produced by the text-based classifiers 241—to the domain of video by training the adapted classifiers 242 based in part on the text-based classifiers. These modules are now described in further detail.

The feature extraction module 232 extracts features from the content items of the labeled content repository 220, the features serving as descriptive representations of their respective content items for use in learning category classifiers. The types of features differ based on the type of the content item from which they are extracted. For example, in the case of text documents from the authoritatively labeled text documents 222, the feature extraction module 232 extracts textual features from the contents of the documents. In one embodiment, the textual features that are extracted are weighted text clusters obtained from Noisy-Or Bayesian networks. (For more details, see, for example, *Learning Bayesian Networks* by R. E. Neapolitan, Prentice Hall, 2003.) These same textual features can also be extracted from the textual metadata of the authoritatively labeled videos 224 (e.g., from the title, description, and keywords associated with a video), although their descriptive power tends to be less than in the case of the labeled text documents 222, given the lesser amount of text in video metadata compared to that in a text document.

The feature extraction module 232 additionally extracts various features from video content of the authoritatively labeled videos 224. In one embodiment, the feature extraction module 232 accumulates a histogram of local features across the video to generate global video features. Specifically, local features are detected on image frames, quantized according to a code book built using hierarchical k-means clustering, and a histogram of code words is accumulated across frames. Laplacian-of-Gaussian filters are exploited to detect interest points in one frame, and local features are determined by computing a 118-dimension Gabor wavelet of texture features on the local region. Other types of feature descriptors can be used as well, such as SIFT (Scale Invariant Feature Transform), GLOH (Gradient Location and Orientation Histogram), LESH (Local Energy based Shape Histogram), or SURF (Speeded Up Robust Features).

The feature extraction module 232 can additionally generate global feature representations of a video by obtaining features for each frame (or a subset of the frames, e.g., based on a given down-sampling rate) and corresponding feature values across frames, thereby forming a time series for each of the types of feature. The feature extraction module 232 then applies a transformation, such as a 1D Haar wavelet transform, and selects moments of the wavelet coefficients as features. For example, one type of content-based feature is color, and a color histogram is computed using hue and saturation with 4×4 bins in the HSV color space, with the mean and variance computed for each color channel, along with the difference of the channel mean between the center and boundary areas of the video frame. Other features include: edge features detected by Canny edge detection, including fraction of edge pixels, an edge direction histogram, and mean edge energy for pixels; a histogram of textons, with a texton vocabulary of size 1000 built using hierarchical k-means clustering; face features such as the number of faces and the ratio of the largest face area to the image area; color motion as measured by the cosine distance of the color distances of consecutive frames; and a shot boundary feature indicating whether a given frame is a shot boundary, as determined by thresholding color differences between frames.

It is appreciated that numerous types of data could be extracted as features of a text document or a video, according to techniques known to one of skill in the art, and the above-described features are merely illustrative of the techniques of one embodiment.

The optional text classifier training module 233 learns text-based classifiers from the authoritatively labeled text documents 222. Specifically, the text classifier training module 233 takes as input the set of training subsets produced by the partitioning module 231 for the authoritatively labeled text documents 222. The text classifier training module 233 uses the feature extraction module 232 to extract textual features from the contents of the documents of the positive and the negative subset for the category. Then, the text classifier training module 233 uses the extracted textual features associated with the documents of the positive and the negative subsets as input to a supervised learning algorithm that outputs a text-based classifier for the category. In one embodiment, the supervised learning uses linear support vector machine (SVM) training algorithms, the use of which is known to one having ordinary skill in the art. The result is one text-based classifier 241 for each category of the category set 205. In another embodiment, a text-based classifier is not learned for a category if the category lacks a sufficient number of authoritatively labeled textual documents—e.g., 1000—to produce an accurate text-based classifier.

In one embodiment, the text classifier training module 233 need not be present in the classifier training subsystem 119, with the text-based classifiers 241 instead being learned on another system and being provided as input to the classifier training subsystem.

The adaption module 234 adapts information obtained from the text domain—i.e., the scores produced by the text-based classifiers 241—to the domain of video content by learning the adapted classifiers 242 based in part on the text-based classifiers. More specifically, the adaption module 234 applies the text-based classifiers 241 to the textual metadata of videos 224, thereby obtaining a set of scores for each video; this set of scores forms a score vector, each score in the vector corresponding to the output of one of the text-based classifiers. However, since the text-based classifiers 241 were trained on the authoritatively labeled text documents 222—which typically have a much greater volume of text, as well as having text with different properties, such as more full sentences—they produce less accurate categorization when applied to the metadata of the videos 117. Thus, the adaption module 234 treats the text-based classifier scores for a video as one set of features for the video and learns the adapted classifiers 242 based on them, optionally in combination with content-based features of the video. The adaption process is described in more detail with respect to FIG. 4, below.

Classifier Training

Figure 3:
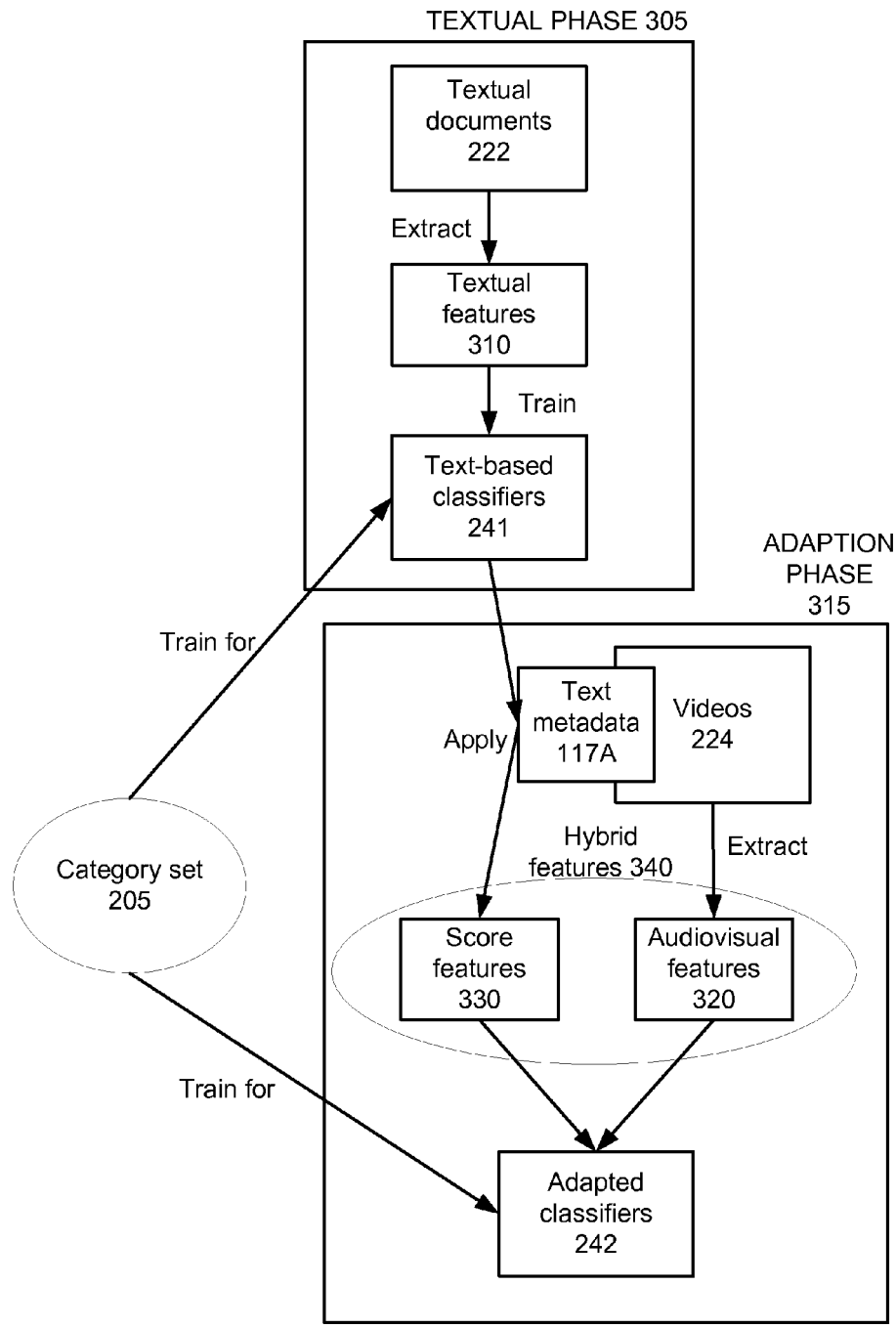
FIG. 3 is a data flow diagram representing the relationships and derivations of the various types of data analyzed and/or produced by the training subsystem, according to one embodiment.

FIG. 3 is a data flow diagram representing the relationships and derivations of the various types of data analyzed and/or produced by the classifier training subsystem 119 of FIG. 2, according to one embodiment.

In an embodiment in which the classifier training subsystem 119 itself creates the text-based classifiers 241, the text classifier training module 233 trains the text-based classifiers based on the contents of the authoritatively labeled textual documents 222, such as web pages, during a textual phase 305. More specifically, the partitioning module 231 partitions the textual documents into positive and negative training subsets for each category in the category set 205—such as the category "/Sports/TeamSports"—and the feature extraction module 232 extracts textual features 310 from the contents of the documents in each subset. A text-based classifier 241 is then trained for each category based on the textual features extracted from the positive and negative subset for that category. The text-based classifiers 241 then produce scores used as part of hybrid features for training the adapted classifiers 242 during an adaption phase 315.

Specifically, hybrid features 340 are formed from authoritatively labeled videos 224 for each category based on two sources of feature data: the textual metadata 117A associated with each of the videos, and the actual audiovisual content of each of the videos. The partitioning module 231 partitions the videos 224 into positive and negative training subsets for each category in the category set 205. Then, regarding the first of these sources of feature data, the adaption module 234 applies the text-based classifiers 241 to the textual metadata 117A of each training subset of the videos 224, thereby obtaining for each video a set of scores 330, one score per classifier. Regarding the second of the sources of feature data, audiovisual features 320 are extracted from the content of each of the videos 224 in each of the training subsets. Together, the score features 330 and the audiovisual features 320 for a given video form the hybrid features 340 for that video. An adapted classifier 242 is trained for each category based on the hybrid features 340 associated with the videos in the positive and negative training subset for that category.

Figure 4:
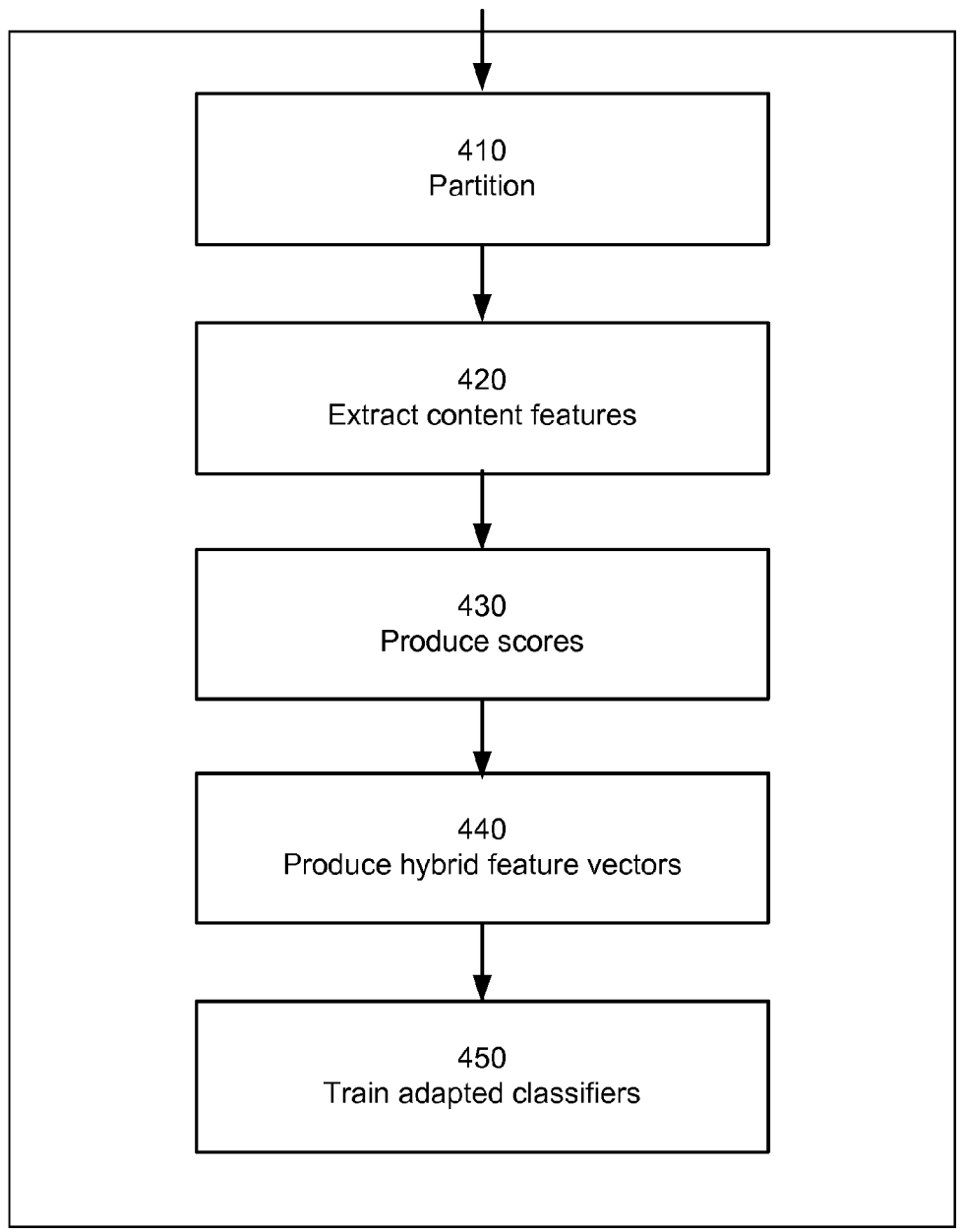
FIG. 4 is a flowchart of a process performed by the classifier training subsystem for training adapted classifiers to categorize videos, according to one embodiment.

FIG. 4 is a flowchart of a process performed by the classifier training subsystem 119 of FIG. 2 during the adaption phase 315 of FIG. 3 for training adapted classifiers 242 to categorize videos, according to one embodiment. The classifier training subsystem 119 partitions 410 the authoritatively labeled videos 224 into positive and negative training subsets for each category in the category set 205, as described above with respect to the partitioning module 231.

The classifier training subsystem 119 further extracts 420 a vector of content features from each of the authoritatively labeled videos 224, as described above with respect to the feature extraction module 232.

The classifier training subsystem 119 additionally produces 430 scores by applying each of the stored text-based classifiers 241 to the textual metadata 117A of each of the authoritatively labeled videos 224. As a result, each video 224 has a K-dimensional vector of scores associated with it, one score for each of the K text-based classifiers corresponding to the K categories in the category set 205, for some integer K. Each score for a video represents how strongly the video represents the category corresponding to the text-based classifier that produced the score, and the scores may be in any order, as long as they correspond to text-based classifiers in the same order for all videos in order to ensure consistency. These scores act as additional features that characterize the video.

The score vectors produced by the text-based classifiers 241 and associated with the authoritatively labeled videos 224 in step 430 are based only on textual metadata 117A of the videos 224. However, the text-based classifiers were trained on the content of text documents 222 (e.g., the body of a web page), as opposed to the textual metadata. Although both text document content and textual metadata are textual in nature, their properties, such as the amount and arrangement of the text, tend to be different, which in turn impacts the accuracy of the text-based classifiers 241 when applied to the video metadata 117A. For example, the textual metadata of videos tends to be incomplete (e.g., the title, tags, and description contain little and/or misleading text), and thus does not provide the text-based classifiers as much input as do the textual documents on which the classifiers were trained. Thus, the score vectors produced by the text-based classifiers 241 based on the textual metadata of videos, taken by themselves, are often of limited value in directly categorizing videos. Even so, they provide useful data for categorization, particularly when used as an input for further learning, as described below.

In one embodiment, the classifier training subsystem 119 produces 440, for each video, a hybrid feature vector comprising both the content feature vector extracted from the video and the score vector obtained from the video. In one embodiment, the score vector is appended to the content feature vector to produce the hybrid feature vector.

With the hybrid feature vectors produced for the various authoritatively labeled videos 224, adapted classifiers 242 are then trained 450 for categories of the category set 205. Specifically, the hybrid feature vectors associated with the videos 224 of the positive and negative training sets for a category are provided as input to a supervised learning algorithm that outputs an adapted classifier 224 for the category. The learning algorithm used to train the adapted classifiers need not be the same algorithm used to learn the text-based classifiers. In one embodiment, for example, the text-based classifiers are trained using an ensemble learning algorithm such as linear SVM, and the adapted classifiers are trained using an ensemble learning algorithm such as AdaBoost, the details and use of which are known to one having ordinary skill in the art.

In principle, there is one adapted classifier 242 for each category; however, in one embodiment, adapted classifiers are trained 450 only for categories with at least some threshold number of positive examples associated with them, e.g. 40. This ensures that an adapted classifier 242 is based on enough data to produce accurate results, rather than potentially becoming less accurate than the purely text-based classifier 241 due to learning from a small and unrepresentative data set.

These adapted classifiers 242 are "adapted" in that they adapt information from the domain of text—namely, the scores produced by the text-based classifiers—for use in another domain, i.e., video. These adapted classifiers 242 can then be applied to an arbitrary video 117—such as a video not labeled by an expert user a category from the category set 205—to determine a category or categories that it represents, the accuracy of this determination being enhanced with respect to the classification by the text-based classifiers alone.

It is appreciated that the steps of FIG. 4 need not be performed in the exact order described. For example, the partitioning 410 could be performed after all the feature vectors have been obtained 420-440, grouping the feature vectors corresponding to the various videos 224. Likewise, the content features could be extracted 420 after the textual scores are produced 430. Similarly, some of the steps could occur partially or entirely in parallel; for example, steps 420 and 430 could be performed at the same time by different processing units.

It is further appreciated that the learning of the adapted classifier 242 need not be based on hybrid feature vectors that combine the scores from the text-based classifiers 241 with other features, such as video content features. Rather, in another embodiment the adapted classifier is learned based solely on the scores from the text-based classifiers 241. In such an embodiment, steps 410, 430, and 450 of FIG. 4 are performed, but not steps 420 or 440.

Uses of the Trained Classifiers

After the training process is complete, each category of the set of categories 205 has some classifier associated with it. In one embodiment, every category has an adapted classifier 242. In another embodiment, only those categories with a threshold number of videos labeled as representing that category have an adapted classifier, and the other categories have only the initial text-based classifier 241 learned from the authoritatively labeled text documents 222.

These classifiers may then be applied to categorize videos 117 from the video repository 116 that do not already have authoritatively applied category labels. The way in which the classifier is applied depends upon the type of the classifier— e.g., an adapted classifier 242, or a text-based classifier 241— with the information provided to the classifier being of the same type used to learn it. For example, an adapted classifier 242 for a category, when applied to a video, takes an input the scores obtained from application of the text-based classifiers 241 to the video, as well as any other types of features (e.g., video content features) used earlier as input to train the adapted classifier. Similarly, a text-based classifier 241 takes as input the textual metadata of the video.

The classifier for each of the K categories in the category set 205 is applied to the videos 117 of the video repository 116, resulting in K scores for each video being classified. A video 117 can be assigned category labels based on the resulting scores in different ways in different embodiments. In one embodiment, a video is assigned a category label for each category whose classifier produces a score above some threshold level indicating sufficient certainty that the video is indeed representative of the category.

In another embodiment, only the top-scoring N categories are used to label the video, for some integer N. In some embodiments, if the category set 205 is a taxonomy tree, a video is not assigned a label with a general parent category having a child sub-category that also applies. For example, if the classifiers for both the "Sports" category and its "Tennis" child category output scores for a given video above the threshold level, the video would be labeled with "Tennis" but not with "Sports," since the latter can be inferred from the former.

The category labels assigned to a video can then be used in various ways by users of the video hosting service 100. For example, the labels of the determined categories can be viewed along with other metadata of a video, e.g., appearing as video tags for the video when viewed in a web-based user interface of a video sharing site. The labels can also be used to browse videos of a particular type, such as showing all videos that were assigned labels of a chosen category, such as "Tennis." Similarly, they can be integrated into more sophisticated search functionality as one input, such as a search for videos of a particular category and having other additional attributes, such as particular text in their titles, a creation date within a given timeframe, or the like. The possible uses of the assigned category label are numerous, and are not limited to these specific examples.

Generalized Data Flow

Figure 5:
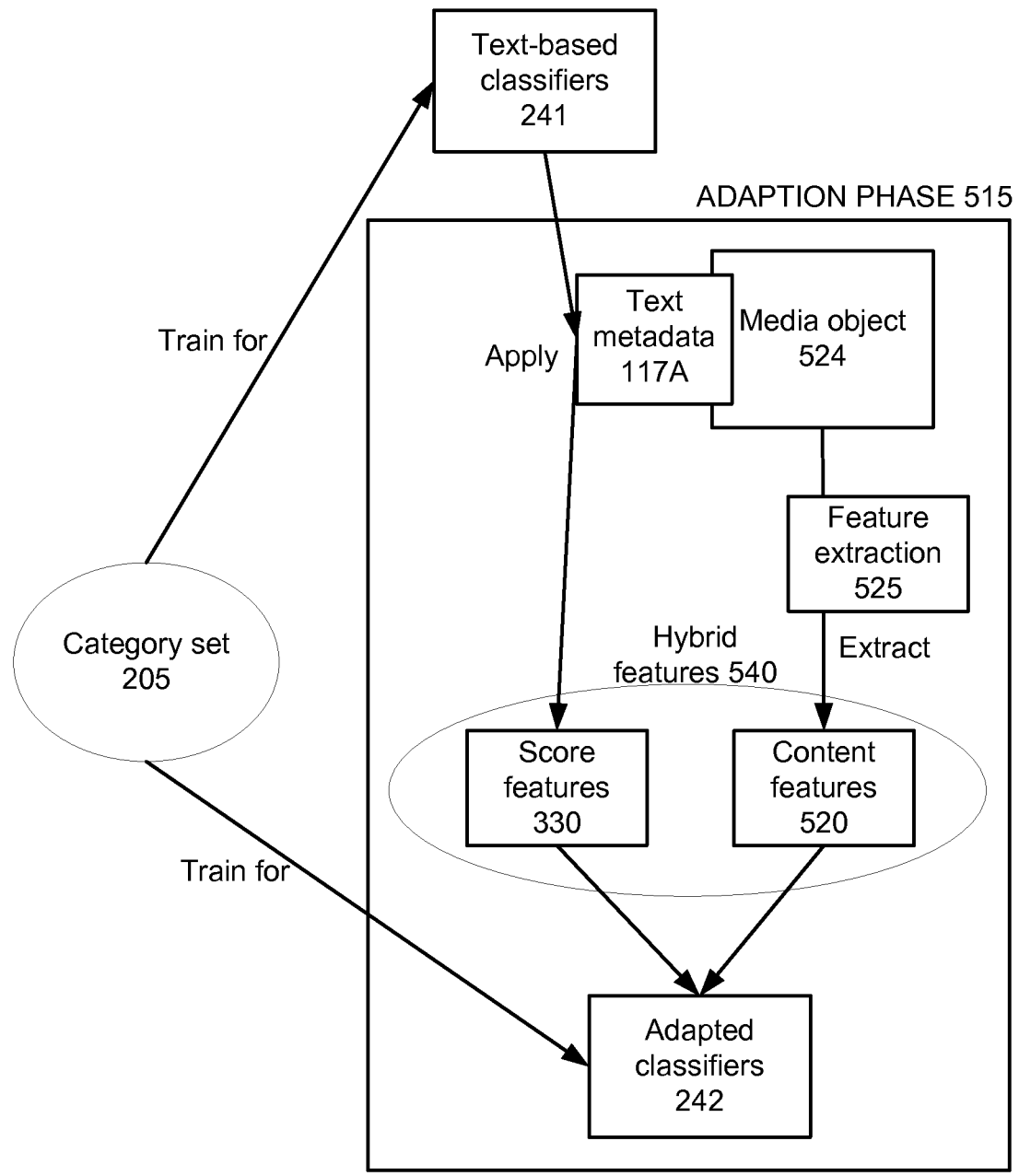
FIG. 5 is a data flow diagram representing a generalization of the relationships and derivations of the various types of data of FIG. 3, according to one embodiment.

Although embodiments of the present invention have been described as performing various specific functions, such as classifying digital videos and training the text-based classifiers, these embodiments may be further generalized. FIG. 5 is a data flow diagram representing one such generalization of the relationships and derivations of the various types of data of FIG. 3, according to one embodiment. Specifically, the classifier training subsystem 119 described above with respect to FIGS. 1-4 need not itself train the text-based classifiers 241, but rather can obtain pre-trained text based classifiers for the various categories from another system or entity, and thus the textual phase 305 of FIG. 3 is not present in FIG. 5.

Further, the subsystem 119 need not be limited to classifying videos, specifically, but can equally train classifiers for arbitrary media objects, such as text documents, images, audio, or other digital objects having associated textual metadata 117A. Thus, in FIG. 5, the arbitrary media object 524 replaces the video 224 depicted in FIG. 3, and is stored in an authoritatively labeled media object repository analogous to the authoritatively labeled videos 224 of FIG. 2.

Nor need the subsystem 119 be limited to extracting only audiovisual features from the content of the videos or other objects being classified. Rather, in the embodiment of FIG. 5, arbitrary types of content features 520 are extracted by a feature extraction module 525. These content features need not include only the audiovisual features extracted by the feature extraction module 232 of FIG. 2, but may additionally or alternatively include higher-level semantic features derived from the audiovisual features. For example, such higher-level semantic features might include a set of scores representing the degree to which the audiovisual features of the media object 524 represent particular real-world objects, as determined by a set of object classifiers. Thus, the semantic features for an image media object 524 depicting a scene at the Antarctic might include a score 0.7 produced by a classifier for a "penguin" object (representing how strongly the image appears to represent a penguin), a score 0.9 produced by a classifier for an "iceberg" object, a score 0.01 for a "lion" object, and the like.

Thus, the adapted classifiers produced by an embodiment carrying out the flow of operations depicted in FIG. 5 can be used to categorize arbitrary media objects in a manner analogous to that described above for classifying videos.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determine" refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter.

Accordingly, the disclosure of the present invention is intended to be illustrative, but not limiting, of the scope of the invention, which is set forth in the following claims.

What is claimed is:

1. A computer implemented method of training video classifiers, the method comprising:
    storing a taxonomy of hierarchically-arranged categories;
    storing a set of labeled videos, each of the labeled videos having associated textual metadata and being initially labeled as representing one or more of the categories;
    storing labels initially associated with a set of text documents distinct from the labeled videos, each stored label corresponding to one of the categories and indicating that the associated text document represents the category;
    identifying, for each of the categories, a positive training subset of the text documents that represent the category based on their stored labels, and a negative training subset of the text documents that do not represent the category based on their stored labels;
    training a set of text-based classifiers based on the positive training subsets and the negative training subsets, each text-based classifier associated with one of the categories and producing, when applied to text, a score providing a measure of how strongly the text represents the associated category;
    identifying, for each of the categories, a positive training subset of the labeled videos that represent the category based on their labels, and a negative training subset of the labeled videos that do not represent the category based on their labels;
    for each video of the positive training subsets of the labeled videos and of the negative training subsets of the labeled videos:
        applying the text-based classifiers to the associated textual metadata of the video, thereby producing a vector of scores for the video, the scores providing measures of how strongly the textual metadata of the video represents the categories associated with the text-based classifiers;
        extracting a content feature vector from video content of frames of the video;
        forming a hybrid feature vector comprising the vector of scores and the content feature vector for that video; and
    training a set of adapted classifiers based on the hybrid feature vectors of the videos in the positive training subsets of the labeled videos and on the hybrid feature vectors of the videos in the negative training subsets of the labeled videos, each adapted classifier associated with one of the categories and producing, when applied to an unlabeled video, a score providing a measure of how strongly the unlabeled video represents the associated category.

2. The computer implemented method of claim 1, wherein the text-based classifiers are trained with a first learning algorithm, and the adapted classifiers are trained with a second learning algorithm different from the first learning algorithm.

3. The computer implemented method of claim 1, wherein the text documents are web pages.

4. The computer implemented method of claim 1, wherein the taxonomy is represented as a taxonomy tree, each node of the tree representing a category, and wherein identifying the positive training subset of the plurality of the labeled videos for a category comprises determining whether a category label of a video corresponds to the category or to a descendant of the category in the taxonomy tree.

5. The computer implemented method of claim 1, further comprising:
applying a first one of the adapted classifiers associated with a first category to a first video, thereby producing a score quantifying a degree to which the first video represents the first category; and
responsive at least in part to determining that the score is greater than a first threshold, automatically labeling the first video with the first category.

6. The computer implemented method of claim 5, further comprising:
receiving a query for videos of the first category; and
providing a result set that includes the first video.

7. A non-transitory computer-readable storage medium storing executable computer program instructions comprising:
instructions for storing a taxonomy of hierarchically-arranged categories;
instructions for storing a set of labeled videos, each of the labeled videos having associated textual metadata and being initially labeled as representing one or more of the categories;
instructions for storing labels initially associated with a set of text documents distinct from the labeled videos, each stored label corresponding to one of the categories and indicating that the associated text document represents the category;
instructions for identifying, for each of the categories, a positive training subset of the text documents that represent the category based on their stored labels, and a negative training subset of the text documents that do not represent the category based on their stored labels;
instructions for training a set of text-based classifiers based on the positive training subsets and the negative training subsets, each text-based classifier associated with one of the categories and producing, when applied to text, a score providing a measure of how strongly the text represents the associated category;
instructions for identifying, for each of the categories, a positive training subset of the labeled videos that represent the category based on their labels, and a negative training subset of the labeled videos that do not represent the category based on their labels;
instructions for, for each video of the positive training subsets of the labeled videos and of the negative training subsets of the labeled videos:
applying the text-based classifiers to the associated textual metadata of the video, thereby producing a vector of scores for the video, the scores providing measures of how strongly the textual metadata of the video represents the categories associated with the text-based classifiers;
extracting a content feature vector from video content of frames of the video;
forming a hybrid feature vector comprising the vector of scores and the content feature vector for the video; and
instructions for training a set of adapted classifiers based on the hybrid feature vectors of the videos in the positive training subsets of the labeled videos and on the hybrid feature vectors of the videos in the negative training subsets of the labeled videos, each adapted classifier associated with one of the categories and producing, when applied to an unlabeled video, a score providing a measure of how strongly the unlabeled video represents the associated category.

8. The non-transitory computer-readable storage medium of claim 7, wherein the text-based classifiers are trained with a first learning algorithm, and the adapted classifiers are trained with a second learning algorithm different from the first learning algorithm.

9. The non-transitory computer-readable storage medium of claim 7, wherein the text documents are web pages.

10. The non-transitory computer-readable storage medium of claim 7, wherein the taxonomy is represented as a taxonomy tree, each node of the tree representing a category, and wherein identifying the positive training subset of the plurality of the labeled videos for a category comprises determining whether a category label of a video corresponds to the category or to a descendant of the category in the taxonomy tree.

11. The non-transitory computer-readable storage medium of claim 7, further comprising:
instructions for applying a first one of the adapted classifiers associated with a first category to a first video, thereby producing a score quantifying a degree to which the first video represents the first category; and
instructions for automatically labeling the first video with the first category, responsive at least in part to determining that the score is greater than a first threshold.

12. The computer implemented method of claim 11, further comprising:
instructions for receiving a query for videos of the first category; and
instructions for providing a result set that includes the first video.

13. A computer system comprising:
a computer processor; and
a computer program executable by the computer processor, the program comprising:
instructions for storing a taxonomy of hierarchically-arranged categories;
instructions for storing a set of labeled videos, each of the labeled videos having associated textual metadata and being initially labeled as representing one or more of the categories;
instructions for storing labels initially associated with a set of text documents distinct from the labeled videos, each stored label corresponding to one of the categories and indicating that the associated text document represents the category;
instructions for identifying, for each of the categories, a positive training subset of the text documents that represent the category based on their stored labels, and a negative training subset of the text documents that do not represent the category based on their stored labels;
instructions for training a set of text-based classifiers based on the positive training subsets and the negative training subsets, each text-based classifier associated with one of the categories and producing, when applied to text, a score providing a measure of how strongly the text represents the associated category;
instructions for identifying, for each of the categories, a positive training subset of the labeled videos that represent the category based on their labels, and a negative training subset of the labeled videos that do not represent the category based on their labels;
instructions for, for each video of the positive training subsets of the labeled videos and of the negative training subsets of the labeled videos:
applying the text-based classifiers to the associated textual metadata of the video, thereby producing a vector of scores for the video, the scores providing measures of how strongly the textual metadata of the video represents the categories associated with the text-based classifiers;

extracting a content feature vector from video content of frames of the video;

forming a hybrid feature vector comprising the vector of scores and the content feature vector for the video; and instructions for training a set of adapted classifiers based on the hybrid feature vectors of the videos in the positive training subsets of the labeled videos and on the hybrid feature vectors of the videos in the negative training subsets of the labeled videos, each adapted classifier associated with one of the categories and producing, when applied to an unlabeled video, a score providing a measure of how strongly the unlabeled video represents the associated category.

14. The computer system of claim 13, wherein the text-based classifiers are trained with a first learning algorithm, and the adapted classifiers are trained with a second learning algorithm different from the first learning algorithm.

15. The computer system of claim 13, wherein the text documents are web pages.

16. The computer system of claim 13, wherein the taxonomy is represented as a taxonomy tree, each node of the tree representing a category, and wherein identifying the positive training subset of the plurality of the labeled videos for a category comprises determining whether a category label of a video corresponds to the category or to a descendant of the category in the taxonomy tree.

17. The computer system of claim 13, further comprising:

instructions for applying a first one of the adapted classifiers associated with a first category to a first video, thereby producing a score quantifying a degree to which the first video represents the first category; and instructions for automatically labeling the first video with the first category, responsive at least in part to determining that the score is greater than a first threshold.

18. The computer system of claim 17, further comprising:

instructions for receiving a query for videos of the first category; and instructions for providing a result set that includes the first video.

* * * * *